United States Patent [19]
Kikinis

[11] Patent Number: 5,893,089
[45] Date of Patent: Apr. 6, 1999

[54] MEMORY WITH INTEGRATED SEARCH ENGINE

[75] Inventor: Dan Kikinis, Saratoga, Calif.

[73] Assignee: Lextron Systems, Inc., Saratoga, Calif.

[21] Appl. No.: 749,992

[22] Filed: Nov. 15, 1996

[51] Int. Cl.⁶ .................................................. G06F 17/30
[52] U.S. Cl. .................. 707/3; 365/230.03; 365/185.33; 365/218
[58] Field of Search ................. 707/3, 4, 5, 6; 1/1; 365/230.03, 185.33, 218

[56] References Cited

U.S. PATENT DOCUMENTS

| | | | |
|---|---|---|---|
| 4,667,330 | 5/1987 | Kumagi ........................... | 371/71 |
| 5,070,475 | 12/1991 | Normoyle et al. ................ | 395/375 |
| 5,548,752 | 8/1996 | Lloyd et al. ..................... | 395/600 |
| 5,563,828 | 10/1996 | Hasbun et al. .................... | 365/185.33 |
| 5,666,480 | 9/1997 | Leung et al. ..................... | 395/180 |
| 5,701,270 | 12/1997 | Mohan Rao ....................... | 365/230.03 |

*Primary Examiner*—Thomas G. Black
*Assistant Examiner*—Michael J. Wallace, Jr.
*Attorney, Agent, or Firm*—Donald R. Boys

[57] ABSTRACT

A memory chip has an on-board search engine adapted to accept programming from a system CPU and to perform a search for a search object or pattern independently of further action by the CPU, wherein the CPU is free to perform other tasks while a search of memory banks composed of two or more such chips takes place. In some embodiments the memory chip has a dedicated bus connection for programming by the system CPU and for reporting the results of a search. In some embodiments as well the on-board search engine has a dedicated on-board bus for communication with column amplifiers and decoders of memory cell arrays on the chip. CPU and memory combinations are disclosed and methods for practicing the invention.

10 Claims, 2 Drawing Sheets

MEMORY WITH INTEGRATED SEARCH ENGINE

FIELD OF THE INVENTION

The present invention is in the area of integrated circuit structures and methods, and pertains in particular to an IC memory with an integrated search engine.

BACKGROUND OF THE INVENTION

The present period of history has been termed by many the information age. Every business and nearly every field of human activity is involved with references, instructions, briefs, periodicals, articles, books, electronic files, video files, and the like. In the area of electronic files, the term multimedia has been applied to mean systems capable of dealing with and displaying/playing electronic files of many sorts. It is clear that an enormous amount of human effort goes into preparing all of these files and documents, and an equally enormous amount of electronic storage has to be allocated to store vast quantities of data.

There exist today many computer applications (programs) designed to work with very large data bases, and in many instances such programs are required to search such data bases for particular and specific pieces of information. As data bases become larger and larger with the many new and sophisticated kinds of electronic files and the proliferation of digitized information in general, and because a system CPU must perform repetitive tasks in searching many data structures in a system, such searching can be a major consumer of system resources.

What is needed as data bases become larger is an apparatus and system that allows a search to be conducted in memory structures while the managing CPU is left free to perform other tasks in parallel with many or all of the search functions.

SUMMARY OF THE INVENTION

Figure 1:
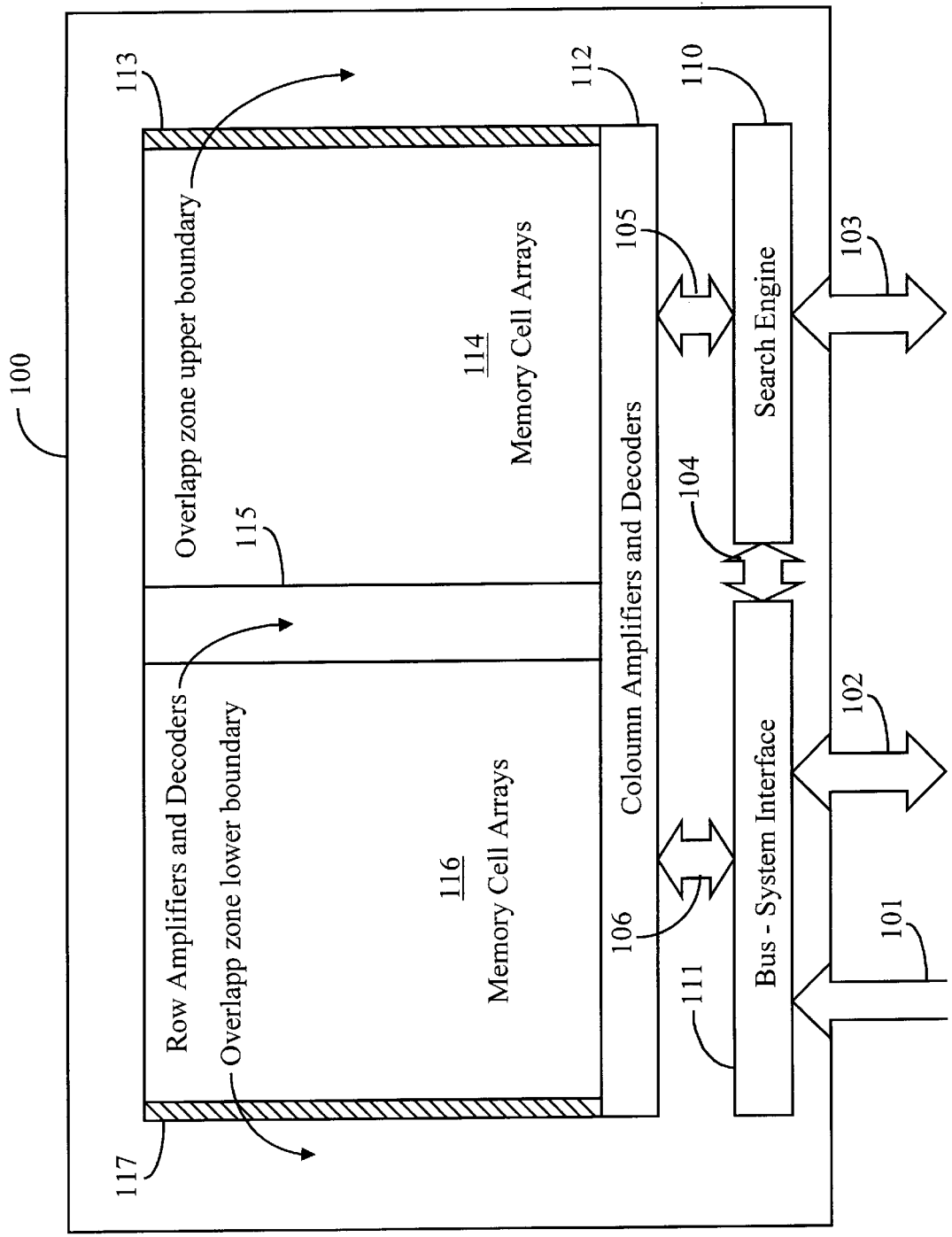
FIG. 1 illustrates architecture of a memory chip according to an embodiment of the present invention.

In an embodiment of the invention an integrated circuit (IC) memory chip is provided comprising at least one memory array; and a programmable search engine implemented on the IC. The programmable search engines adapted to receive a search standard and to accomplish a search according to the standard independent of activities remote to the IC memory chip.

Memory chips in some embodiments of the invention are dynamic random access (DRAM) memory chips. In other embodiments other sorts of memory chips are used. In some embodiments there are upper and lower overlap zones at the upper and lower ends of the memory address space assigned to the chip, wherein a range of addresses at an upper end of the address space of an address-numerically-adjacent chip is redundantly stored in the lower overlap zone, and a range of addresses at a lower end of the address space of an address-numerically-adjacent chip is redundantly stored in the upper overlap zone. This feature ensures that patterns and strings searched may be reported to the CPU even if the pattern or string is partly recorded on one chip and partly on another.

There is in some embodiments a redundant on-chip bus between the search engine and column amplifiers and decoders of the memory arrays on the chip. Further, in some embodiments the chip comprises a connection to a conventional address and data bus, and further comprises a connection from the search engine to a dedicated bus adapted for programming the search engine. The dedicated bus may include one or more assertion lines adapted for informing a CPU of accomplishment of a search object.

Memory chips according to embodiments of the invention may be combined in data banks in a manner such that a search to be performed may be programmed into the individual chips of the data bank, and individual searches may be performed substantially simultaneously I each of the chips. The search is then much shorter in duration, and the CPU is left free to perform other tasks while a search is conducted.

The unique combination of a search engine with an IC memory chip and the further combination of such chips in a data bank provide for a data bank capable of recording massive amounts of information, including digitally-recorded natural data, which may be quickly and efficiently searched without adding to the burden placed on the system CPU.

DESCRIPTION OF THE PREFERRED EMBODIMENT

In embodiments of the present invention, memory units are combined with search engines in a manner that each chip in a memory array has a search engine. For the purpose of this specification a Search Engine is broadly defined as an engine capable of receiving a search object and canvassing a data base to find a match or even an approximation of the search object. Search objects within this definition can be text strings, data strings, patterns wave forms, or virtually any other characteristic of anything that may be digitally stored and for which a search may be desirable, whether or not an exact match is required A bank of memories containing many chips then has as many search engines as chips. In such a system when a search is called for, the system CPU programs the search engines which operate in parallel to perform the needed search, and inform the CPU when a match is made. The CPU in the meanwhile is free to perform other tasks.

FIG. 1 is a block diagram of a DRAM memory chip 100 according to an embodiment of the present invention. The invention is particularly adaptable to DRAM, but not limited to any particular sort of IC memory. Two memory cell arrays 114 and 116 are depicted, with rows of cells connected to row amplifiers and decoders 115 and columns connected to column amplifiers and decoders 112, as is well-known in the art. The column amplifiers and decoders are connected via an on-chip bus structure 106 to a bus system interface 111, which in turn connects off-chip to address bus 101 and data bus 102. All of the elements and connectivity thus far described is conventional and well-known in the art. In other embodiments the number of arrays inside the chip could vary. Also the aspect ratio of column and row drivers can vary. In yet another embodiment, the address and data busses may be multiplexed. Also the search-engine bus could be multiplexed with the address bus, for example, or all of address, data and search buses could be multiplexed. All of these and many other combinations do not deviate from the spirit and scope of the invention.

In the present embodiment a unique search engine 110 is implemented on the same chip as the memory cell arrays, and communicates with column amplifiers and decoders 112 through a dedicated on-chip bus 105, separate from bus 106.

On-chip bus 105 is optional for some embodiments of the invention, and provides increased communication bandwidth. Search engine 110 connects on-chip to bus system interface 111 via an intermediate bus 104, allowing the search engine to share address and data lines with buses 101 and 102, and off-chip to a special bus 103 which allows the CPU to program the search engine independently of the conventional bus, and also allows the search engine to interrupt the CPU when a search object is accomplished.

Figure 2:
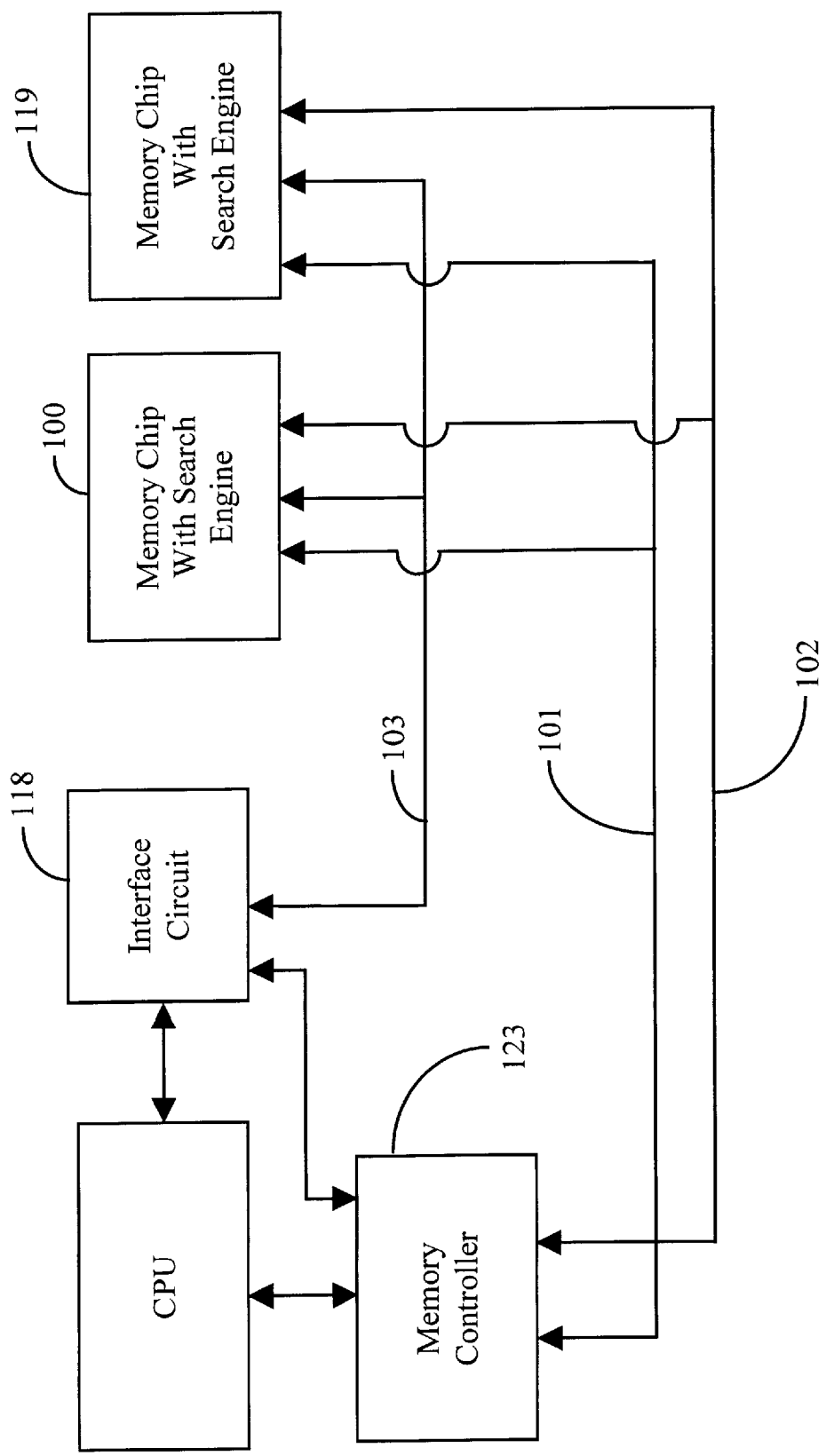
FIG. 2 is a block diagram of a combined CPU and memory subsystem according to an embodiment of the present invention.

FIG. 2 is a block diagram depicting a system CPU 120 and two memory chips 101 and 119, wherein the CPU and the chips are coupled by buses 101, 102, and 103, also shown in FIG. 1. Bus 103 is interfaced to CPU 120 through interface circuitry 118, and buses 101 and 102 interface through memory controller 123. It will be apparent to those with skill in the art that there are many alternatives to the structure shown in FIG. 2, which is exemplary. There is also an optional link between the search bus and the memory controller The inventors are aware that, considering the rapid proliferation of data types, file types, and electronic document types, there are many kinds of search functions that will become common in the future. For example, many sorts of natural data, with a continuing trend to larger and cheaper memory, are being routinely digitized and stored IC memory arrays. Voice data and video data is being stored in a digital compressed format, and such conversion and storage will become more common in the future.

The typical way a search is performed is to enter a search standard and scan memory arrays one after another until a match is found in the memory to the search standard. In some instances a perfect match is required. In other instances an approximation may be sufficient, such as is the case provided by a pattern match or wavelet analysis. The latter case is more likely when searching digitized natural data, such as digitized video data. The inventors are aware that search patterns and strings may be relatively lengthy, and that in some instances a pattern being searched may lie partly in one array and partly in another. For example, the first portion of pattern being sought may be stored in the highest portion of one bank and the last portion in the lowest portion of a next memory bank.

Because of the overlap possibilities in storage protocol, overlapping redundant upper and lower boundary zones are provided in chips according to embodiments of the present invention. On chip 100 of FIG. 1 a lower overlap zone 117 and an upper overlap zone 113 are provided, wherein the width of the zones is about the length of any pattern or string expected to be searched. In this unique scheme, redundant information is stored on numerically adjacent chips. That is the information stored in the lower overlap zone of one chip is also stored in the upper overlap zone of another chip, adjacent to the first chip in address numbering assignment. In this manner a requested pattern match may be found on two numerically adjacent chips that would not be found on either without the overlap zones. In the case of no overlap memory, the CPU of the system would have to deal with the issue of overlapping patterns, for example by either moving memory content, or doing a search itself. Other methods could be used as well.

A search engine according to an embodiment of the present invention may be implemented in a variety of ways, preferably in a programmable mullet-mode. Such an engine could be made using neural nets, wavelet recognition, or any other kind of existing pattern recognition or search mechanisms, and that engine would be programmable.

A search engine according to an embodiment of the present invention must also be organized according to the organization of the data in memory to look for specific types of data. For example, given a memory organization wherein multi-dimensional objects are represented by stripes and/or segments, a search engine could be programmed in a way that allows the memory to look for the stripes or segments of multidimensional memory objects, and the search engine would then perform the search according to those memory stripes rather than a linear search.

In another embodiment of the invention, a striping organization as described above could be pre-calculated by the CPU, and then each search engine just receives the simple search pattern to look for. This approach could also be used to find multi-dimensional data, such as 3 dimensional graphics etc.

Once a search engine finds a pattern, it asserts a result line in Bus 103 notifying the system CPU of finding the pattern. A second result line is asserted after a preset time wherein the requested pattern is not found, or in the event of an error.

In a system according to the embodiment described, after initializing all the search engines in a large memory array via bus 103, a system CPU is free to perform other tasks. Then, after a short period of time, the results of the search are returned from the memory banks. At this point the CPU has only to communicate with those memory units that have reported a match, and may then retrieve the searched for data and continue operation.

In the descriptions above block diagrams are sufficient, as it is within the purview of those with skill in the art to design and implement the combination of elements that constitute the invention. The invention lies not in the elements themselves, but in the unique combination that provides an enormous advantage over conventional structures and methods for performing searches.

It will be apparent to those with skill in the art that there may be many alterations made in the embodiments described without departing from the spirit and scope of the invention. For example, as was described, there are many alternative forms the search engine may take. The present invention is not in the structure of the invention, but in the combination of a search engine with plural memory units and in the use of the engines. The size of overlap zones may vary, different sorts of both volatile and non-volatile IC memory structures may be implemented according to embodiments of the invention, and the size of individual units is not limiting to the invention. There are similarly many architectures that my be implemented using memory units, CPUs and bus structures within the spirit and scope of the present invention. The invention is limited only by the claims which follow.

What is claimed is:

1. A Dynamic Random Access Memory (DRAM) chip comprising:

at least one memory array;

a programmable search engine implemented on the DRAM chip; and a programming interface to a CPU;

wherein the programmable search engine receives a search standard from the CPU on the programming interface, the search standard defining stored data to be found in the memory array, and accomplishes a search according to the standard.

2. The memory chip of claim 1 further comprising upper and lower overlap zones at the upper and lower ends of the memory address space assigned to the chip, wherein a range of addresses at an upper end of the address space of an address-numerically-adjacent chip is redundantly stored in the lower overlap zone, and a range of addresses at a lower end of the address space of an address-numerically-adjacent chip is redundantly stored in the upper overlap zone.

3. The memory chip of claim 1 further comprising a redundant on-chip bus between the search engine and column amplifiers and decoders of the memory arrays on the chip.

4. The memory chip of claim 1 wherein the chip comprises a connection to a conventional address and data bus, and further comprises a connection from the search engine to the programming interface adapted for programming the search engine.

5. The memory chip of claim 4 wherein the programming interface includes one or more assertion lines adapted for informing a CPU of accomplishment of a search object.

6. A combined CPU and memory system, comprising:
a CPU;
a plurality of DRAM chips, wherein two or more of the DRAM chips have an on-board programmable search engine;
a conventional bus coupling the CPU and the two or more DRAM chips; and
a programming interface coupling the search engines to the CPU;
wherein the CPU programs the two or more search engines to perform substantially simultaneous searches on the associated DRAM chips independently of further action of the CPU after the programming is accomplished.

7. The combined system of claim 6 wherein the search engines are adapted to report the accomplishment of a search object to the CPU via the programming interface.

8. The combined system of claim 6 wherein the memory chips further comprise upper and lower overlap zones at the upper and lower ends of the memory address space assigned to the chips, wherein a range of addresses at an upper end of the address space of an address-numerically-adjacent chip is redundantly stored in the lower overlap zone, and a range of addresses at a lower end of the address space of an address-numerically-adjacent chip is redundantly stored in the upper overlap zone.

9. The combined system of claim 6 wherein each DRAM chip further comprises a redundant on-chip bus between the search engine and column amplifiers and decoders of the memory arrays on the chip.

10. A method for performing a search by a system CPU in a bank of memory chips, comprising steps of:
(a) implementing a programmable search engine on two or more of the memory chips in the bank of memory chips;
(b) programming by the CPU of the two or more search engines to substantially simultaneously perform the search independently of further action by the CPU; and
(c) receiving search results by the CPU.

* * * * *